Figure 1:
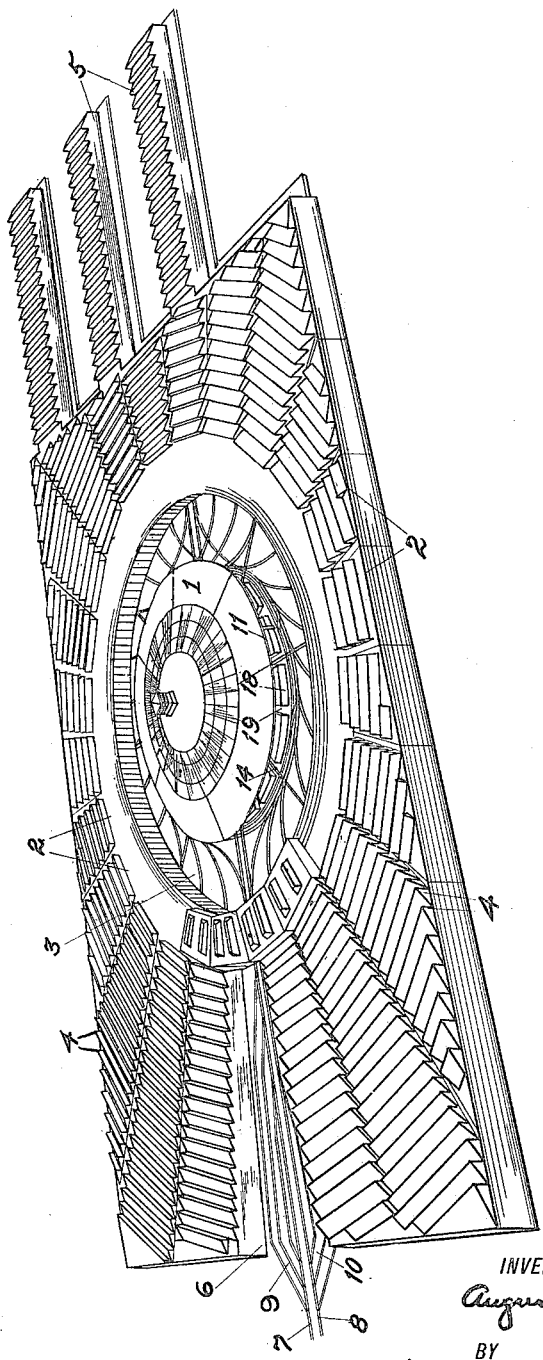

A. SCHILLING.
TERMINAL WAREHOUSE.
APPLICATION FILED AUG. 21, 1916.

1,207,226.

Patented Dec. 5, 1916.
6 SHEETS—SHEET 1.

WITNESS

INVENTOR
August Schilling
BY
Acker, Tallers
his ATTORNEYS

A. SCHILLING.
TERMINAL WAREHOUSE.
APPLICATION FILED AUG. 21, 1916.

1,207,226.

Patented Dec. 5, 1916.
6 SHEETS—SHEET 3.

WITNESS

INVENTOR
August Schilling
BY
Acker & Totten
his ATTORNEYS

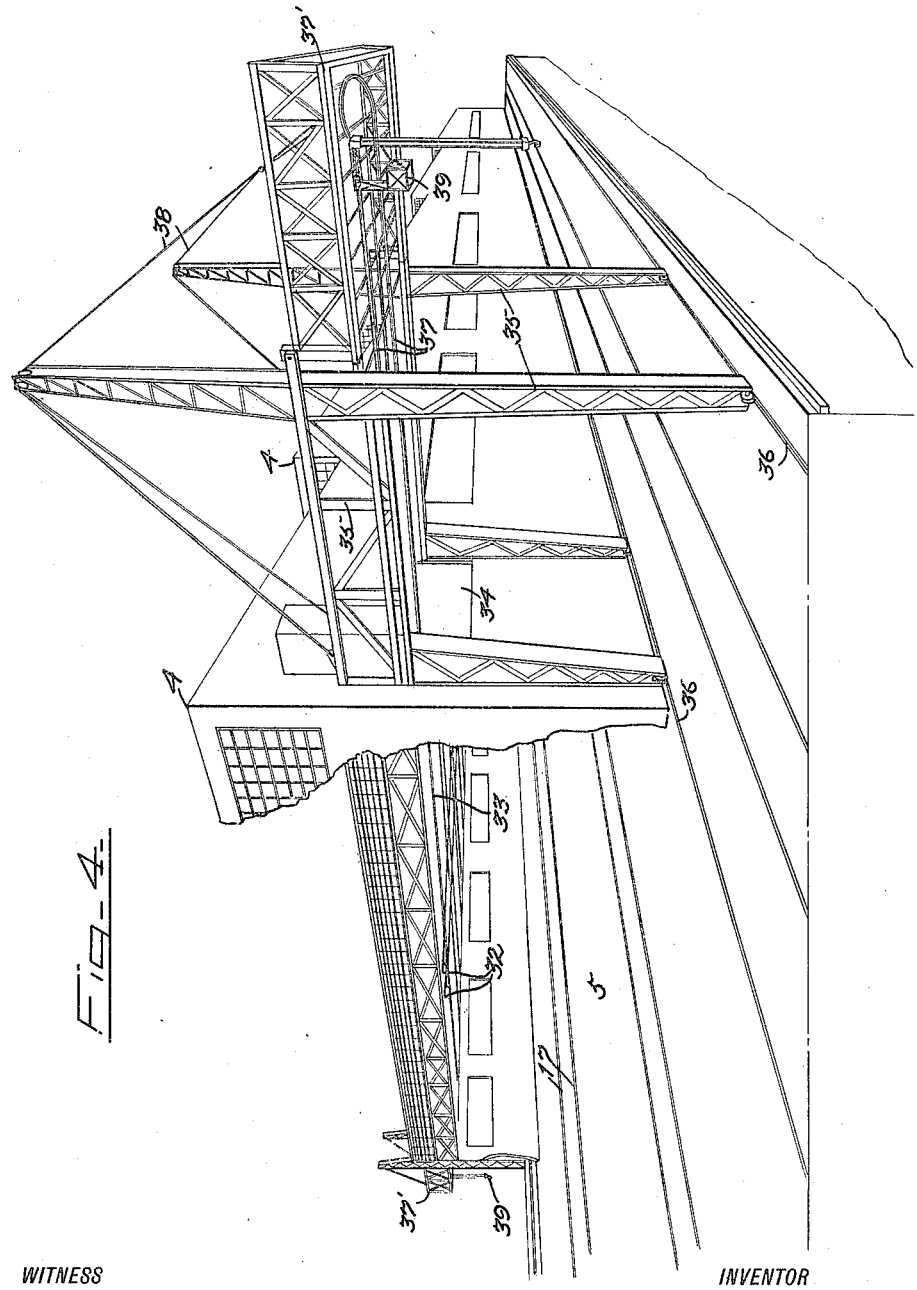

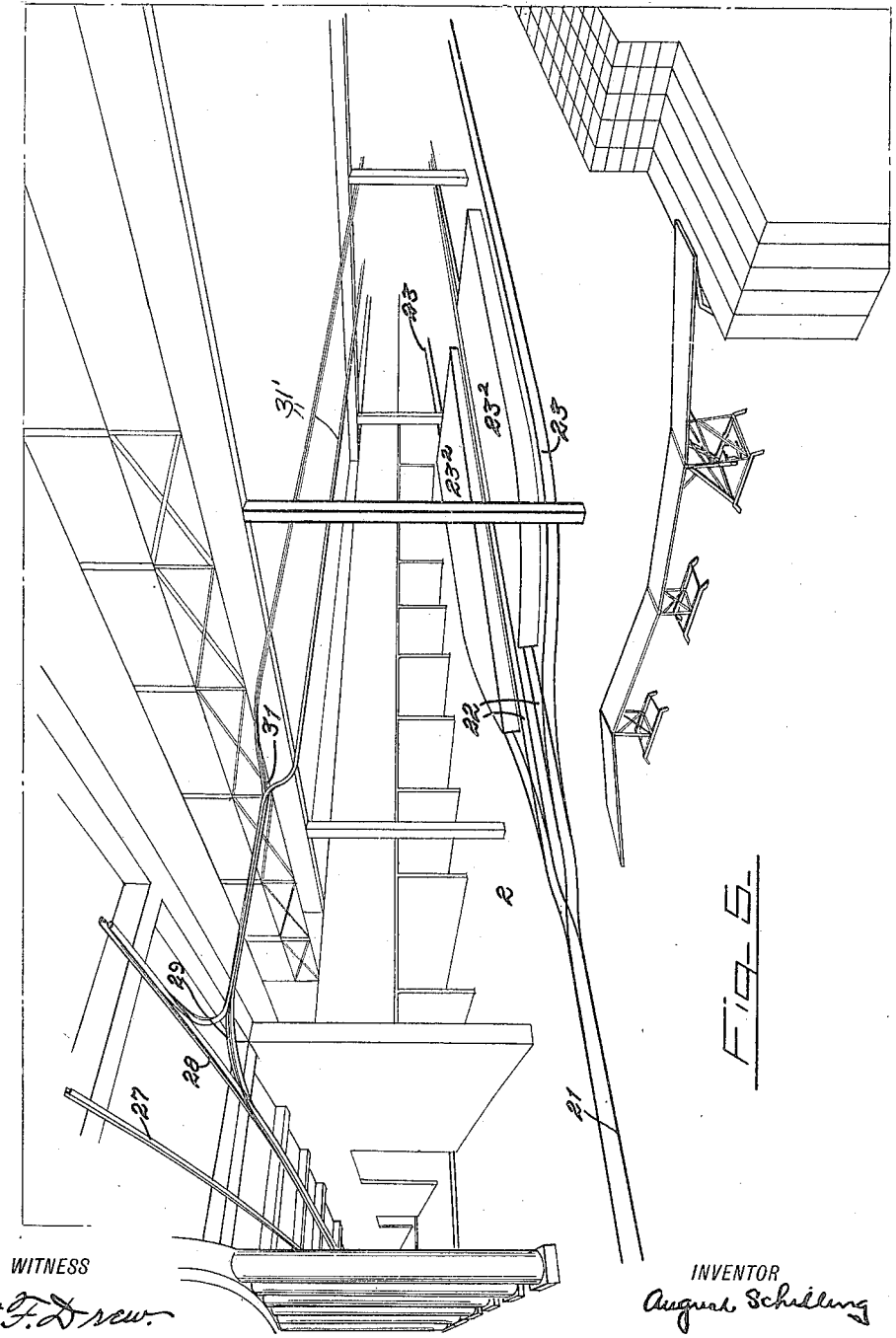

A. SCHILLING.
TERMINAL WAREHOUSE.
APPLICATION FILED AUG. 21, 1916.
1,207,226.
Patented Dec. 5, 1916.
6 SHEETS—SHEET 6.
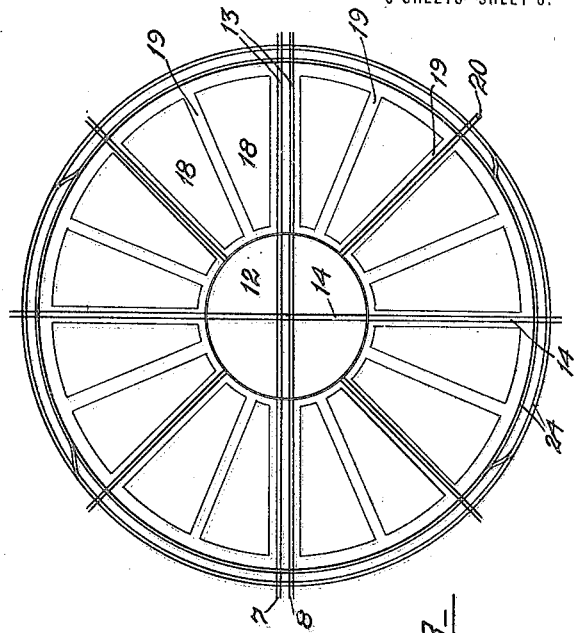
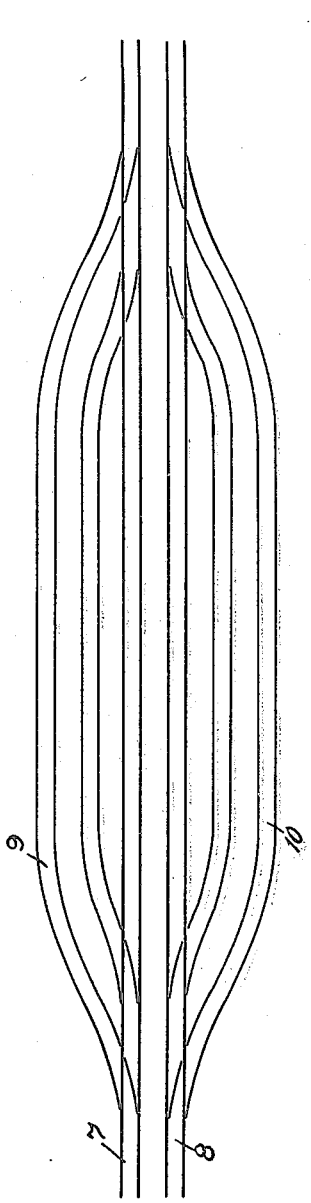
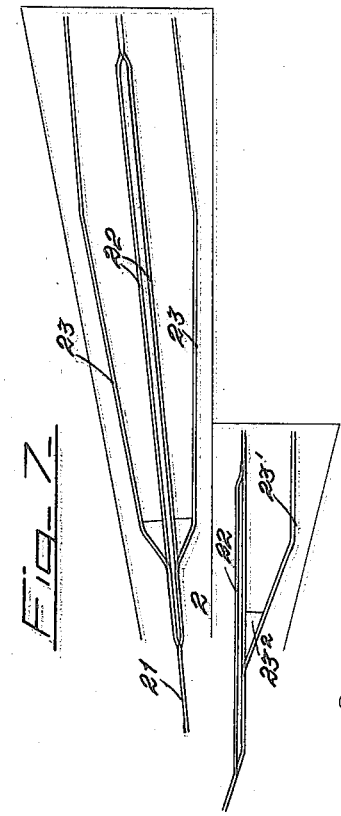
WITNESS
Wm. F. Drew.
INVENTOR
August Schilling
BY
Acker & Totten
his ATTORNEYS

UNITED STATES PATENT OFFICE.

AUGUST SCHILLING, OF WOODSIDE, CALIFORNIA.

TERMINAL WAREHOUSE.

1,207,226.	Specification of Letters Patent.	Patented Dec. 5, 1916.

Application filed August 21, 1916.   Serial No. 116,211.

*To all whom it may concern:*

Be it known that I, AUGUST SCHILLING, a citizen of the United States, residing at Woodside, in the county of San Mateo and State of California, have invented certain new and useful Improvements in Terminal Warehouses, of which the following is a specification.

The hereinafter described invention relates to what shall be termed a terminal warehouse, that is, a warehouse designed and constructed to receive goods from vessels and railways for the storing thereof or for the rearrangement of the goods for transportation to other points; the essential feature involved being the providing of what may be termed a community warehouse for the merchants generally of any given city, thereby enabling the wholesale merchants of a city to house their goods within a common warehouse, instead, as is common practice, for the merchants to store their goods in independent and separate houses. By thus providing a community terminal warehouse, the expense at present incurred of maintaining independent or individual warehouses is obviated, equally so, the expense of draying the goods from the railways and docks to said houses for storing purposes and also the expense of re-draying the goods from such separated and scattered warehouses to the railways and docks for re-distribution is disposed of.

As well known, the present method employed by the producers for the marketing of products has become an important question, both to the producer and also to the retailer and consumer, and as it is at present conducted without system and at a great unnecessary expense, the profit to the producer is reduced and the cost to the consumer is increased, the producer and retailer are not brought into direct contact, as the majority of the transactions are consummated through one or more middlemen or brokers.

It is the object of the present invention to systematize and to centralize the marketing or distribution of the merchandise or products of any given large producing or agricultural section, to provide a means for receiving merchandise for grading and redistribution, either in large or small quantities, and to the accomplishment of this end I have provided a terminal warehouse which will enable the producers of any given section or locality to ship their merchandise, manufactures or products, such as raisins, nuts, vegetables—canned, dried, or fresh fruits, which are the principal products of this section, to one central point or warehouse, where they may be stored until a future time or re-distributed in either mixed or solid carload lots for shipment direct to many hundred points of distribution, instead of as now to a few large cities for re-distribution, thereby drawing the producer and consumer in closer contact, reducing the cost of marketing the products and thereby increasing the profit of the producer and reducing the cost to the consumer.

Further objects of the present invention are to provide a warehouse which will enable the grading, loading, unloading and storing of the merchandise to be accomplished at little cost, one wherein mixed lots of merchandise may be easily and quickly collected from a plurality of separate storage spaces and centralized at one point for loading as a single cargo; one wherein there preferably is provided facilities for docking vessels, enabling the cargoes thereof to be quickly unloaded and either stored or immediately re-shipped without unnecessary handling, one which will enable merchants of other localities to store quantities of products or merchandise and under directions from their main or head office to retail the same under their personal name, without the necessity of employing a personal representative to attend to such distribution. To construct and arrange a warehouse so that favorable conditions for the carrying out of a highly economic system of mercantile distribution will be provided; facilitating legitimate and all around beneficial coöperation between producers and distributers, and providing efficient and economic storage for wholesale and retail merchants carrying a great variety of merchandise.

The preferred form of warehouse consists of a circular assembling and re-distributing court having radiating therefrom a number of storage warehouses all intercommunicating with tracks, to facilitate the making up of mixed cargoes of great variety for shipments by rail or water, or the distributing of varied shipments from cars or vessels into the proper storage warehouses adapted for the storing of the respective commodities; the court also providing the space and facilities for grading and standardizing various commodities for re-shipment or storage in a systematic manner; the storage warehouses each being provided with an assembling platform closely intercommunicating by rail and overhead transfer systems with those of other storage warehouses and with the general assembling court, and preferably providing ship docking facilities having communication by tracks and overhead conveying systems with the central distributing and assembling court and with the respective storage warehouses.

With the above mentioned and other objects in view, the invention consists in the novel construction and combination of parts hereinafter described, illustrated in the accompanying drawings, and pointed out in the claims hereto appended; it being understood that various changes in the form, proportion, size, and minor details of construction within the scope of the claims may be resorted to without departing from the spirit or sacrificing any of the advantages of the invention.

To more fully comprehend the invention, reference is directed to the accompanying drawings, wherein—

Figure 2:
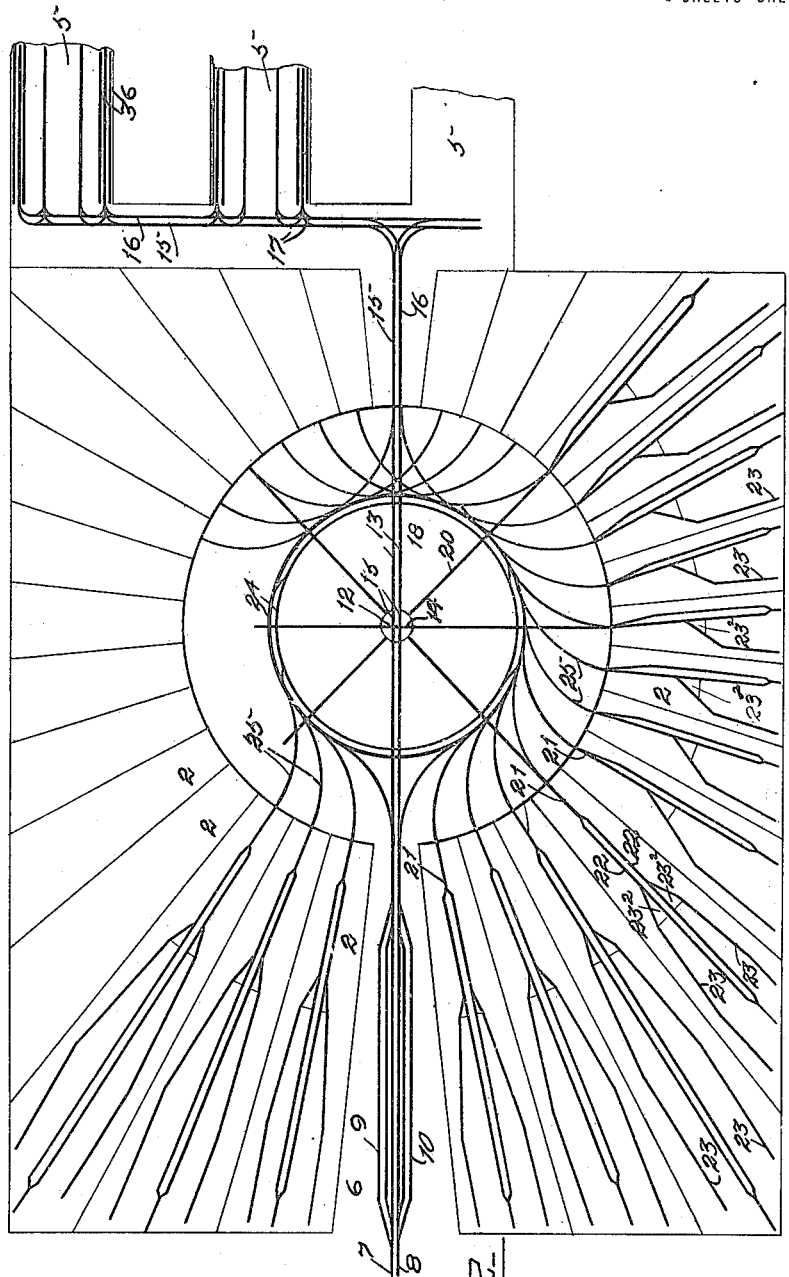
Figure 3:
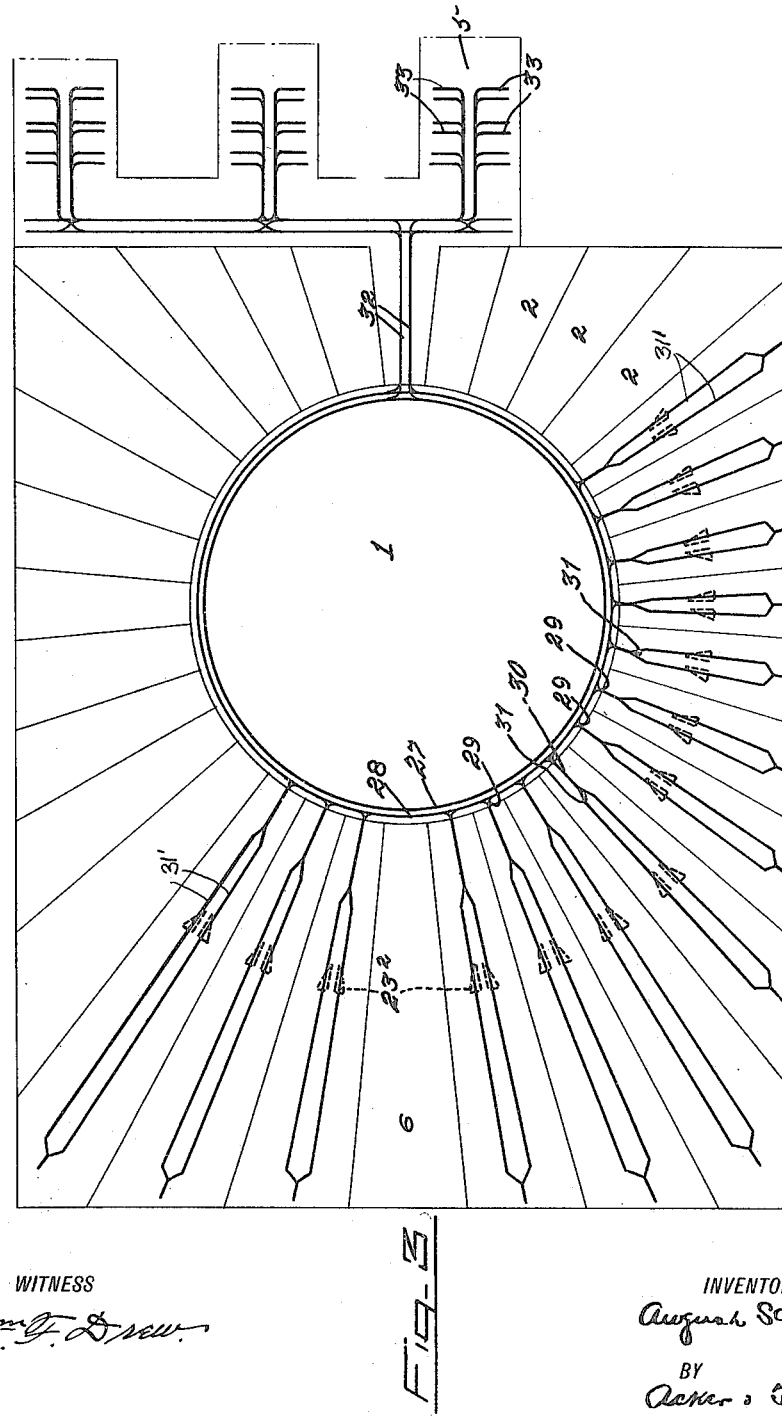

Figure 1 is a bird's-eye perspective view of the preferred embodiment of my invention, illustrating the central assembling court, the storage warehouses radiating therefrom, the trackways leading to the court and connecting with the warehouses, and the piers whereby ship docking facilities are provided. Fig. 2 is a diagrammatic view of the assembling court, illustrating the storage warehouses radiating therefrom, and more fully disclosing the intercommunicating trackage system connecting the various warehouses with the central assembling court. Fig. 3 is a diagrammatic view of the preferred form of intercommunicating telpher or overhead trackage system connecting the respective storage warehouses with the piers. Fig. 4 is a view in broken elevation of one of the piers, illustrating an embodiment of the preferred form of movable crane for loading or unloading a vessel and connecting with the overhead trackage. Fig. 5 is a view in interior elevation of one of the storage warehouses illustrating the railway and overhead trackage, the loading and unloading platforms and the merchandise storage spaces. Fig. 6 is a view in plan of the main trackage and sidings at the warehouse entrance. Fig. 7 is a view in detail plan of the form of trackage for the storage warehouses. Fig. 8 is a view in plan of the central assembling court, illustrating the turn-table, the loading and unloading platforms radiating therefrom and the trackage system coöperating with the platforms and turn-table.

Referring more particularly to the several views of the drawings, wherein like characters of reference designate corresponding parts, 1 indicates a suitable assembling building, preferably circular in form, and communicating therewith at one end are the radially disposed storage warehouses 2, which are spaced from the assembling building by an open passage 3. To provide maximum light and ventilation, the warehouses are preferably formed with what are commonly termed "saw-toothed" roofs 4. It is desirable to construct the warehouse on land having a deep water frontage, to provide facilities for the importing and exporting of merchandise and to carry out this purpose a plurality of docks or piers 5 extending into deep water are arranged to communicate with the assembling building through a passage, as in Figs. 2 and 3 of the drawings.

An entrance 6, Fig. 1 of the drawings, is provided between certain of the storage warehouses 2 and provides the only communication from the outside with the interior of the assembling building 1.

Suitable railway tracks 7 and 8 for incoming and outgoing merchandise shipments are laid in the entrance 6 and connect the interior of the warehouse with suitable transportation lines, over which pass merchandise cargoes entering or leaving the warehouse by overland transportation. The tracks 7 and 8 are preferably provided with sidings 9 and 10—Figs. 1 and 6, for accommodating either filled or empty cars entering or leaving the warehouse. On the sidings 9 are collected the cars leaving the warehouse at the making up of an outgoing train and on the sidings 10 are run the incoming filled or empty cars for loading.

Positioned preferably centrally of the open court 11 which is located beneath the roof of the assembling building 1 is a suitable turn-table 12, provided with intersecting tracks 13 and 14, the tracks 13 being adapted to connect with the ends of tracks 7 and 8 and in turn connect them with other tracks 15 and 16 leading to the piers or docks 5, and which are interconnected by the switches 17.

Surrounding the turn-table 12 are the grading, loading and unloading platforms 18—Fig. 8, preferably segmental in form and separated from each other by the aisles or passages 19 and extending from the peripheral edge of said table, and positioned in certain of said passages 19, are the tracks 20 which are adapted to be connected at their inner end by the track 14, on the rotation of the turn-table to certain positions. The outer ends of the tracks 20 communicate with certain of the tracks 21 extending longitudinally of the respective storage warehouses 2, and said tracks 21 are divided to provide double tracks 22 within certain portions of the warehouses, which facilitates the moving of cars in the respective warehouses without interference. In the warehouses A, having great depth there is provided a spur-track 23 leading from each of the tracks of the double track 22, and in the other or shallow warehouses B, a spur-track 23′ from only one track is provided.

Between the main and spur-tracks in each warehouse, Fig. 5 of the drawings, there is provided a loading and unloading platform $23^2$ adjacent which the cars are stationed when it is desired to load or unload the same, and on which the merchandise is deposited prior to loading into the cars or prior to distribution for storage on being unloaded from cars.

Around the periphery of the loading platforms 18, Figs. 2 and 8 of the drawings, are the communicating double tracks 24, the outer one of which connects with the ends of tracks 21 by certain curved switches 25.

By the described tracking arrangement, cars may be moved from one storage warehouse to another, they may also be moved to or from the piers, to or from the central loading platform, or to or from the inclosure. The trackage system permits of the loading or unloading of a portion of the car at one platform and the transferring of the car to one or more of the other warehouses to complete the loading or unloading thereof; thus the loading or unloading of the cars may be accomplished in the quickest possible time, with the least handling of the goods.

To further expedite the collection of merchandise for shipment or the distribution to its proper storage warehouse of merchandise as received, there is provided a telpher or overhead conveyer system,—Fig. 3 of the drawings, consisting of the main rails 27 and 28 arranged overhead, as in Fig. 5 of the drawings, the outer rail 28 communicating through switches 29 with suitable rails 30 extending longitudinally overhead in each storage warehouse and branching, as at 31, to provide portions 31′ which are positioned over each platform 23. Suitable overhead rails 32 communicate with rails 27 and 28 and extend overhead to the respective piers 5 and are provided at said piers with lateral rails 33 extending outwardly to each opening 34 in the pier warehouse, Fig. 4 of the drawings.

To facilitate the loading and unloading of vessels at the piers, a derrick or platform 35 is provided at the outer longitudinal side edges of the piers, as in Fig. 4 of the drawings, and the same are movable longitudinally of the piers on tracks 36 to position the rails 37 carried thereby to register with the ends of the lateral rails 33 terminating at each opening 34. A portion 37′ adapted to project over the side of the pier and to overhang a vessel docked thereat is pivotally connected at its inner end to said derrick or platform 35, and is capable of being raised or lowered by any suitable means, as the cables 38, to admit of the moving of the derrick relatively to a docked ship or vessel. Any suitable cars or carriers 39—Fig. 4 of the drawings, are mounted on the telpher system to carry the merchandise within the warehouses.

In the warehouse as designed, merchandise arriving by rail, if the same is in solid car lots, may be switched to any desired storage warehouse and there unloaded for storage, or if the same is to be re-shipped in smaller lots, the car may be moved alongside of one of the assembling platforms and the contents thereof separated into the desired shipments, and there graded or standardized, to be loaded into other outgoing cars.

Should the contents of the incoming cars be for export, the cars may be switched directly onto the piers and the contents removed therefrom and deposited into the ship hold, while again cargoes arriving by ships may be loaded by the overhead system directly into cars on the piers for shipment to various points inland or may be carried to the various storage warehouses for shipment at future times, or again it may be carried to the loading and unloading platforms and there graded or standardized prior to storage or further shipment.

When mixed lots of merchandise stored in the various warehouses are desired to be collected for shipment, the car in which the same are to be shipped may be switched about the various warehouses and the merchandise to comprise the cargo thereof, which has been previously collected on the respective platforms, may be loaded thereon or the car may be moved to any desired storage warehouse and the merchandise from other storage warehouses may be delivered thereto by the telpher system for loading into the car.

It will be apparent that a warehouse has been provided wherein shipments of either solid or mixed carload lots of merchandise may be quickly and cheaply unloaded or collected for shipment, one wherein merchandise may be stored, and one wherein both rail and water shipments may be cared for.

By use of the present designed warehouse, the producers are enabled to ship in either mixed or solid car lots to many hundreds of points throughout the country directly to the retailer, in the majority of cases eliminating the jobber and bringing the producer, retailer and consumer in closer relation, thereby stimulating trade and enabling the producer to quickly realize on his products or merchandise as the case may be.

It will be understood that the invention contemplates an independent terminal warehouse for each community, the arrangement thereof being such that each wholesale merchant is enabled to have his goods stored in an individual unit thereof for future re-distribution, or a number of merchants may utilize in common one or more of the individual units of the said terminal warehouse.

By the use of the described invention the receiving, shipping and re-distributing clerks of the terminal warehouse act as the general agents,—so to speak—for the various wholesale merchants whose goods are received for storage, or transportation or re-distribution in the terminal warehouse, and the general handling of the goods for the merchants is conducted by the organized force of the terminal warehouse, thereby eliminating the individual organized shipping force at present employed by the wholesale merchants employing separated and scattered warehouses for the storage of the goods to be later re-distributed for shipment. Thus, the receiving, handling, and re-distribution of goods for the wholesale merchants of a community is conducted under one roof and by an organized force under the control of the manager of the terminal warehouse; and by thus systematizing the receiving, handling and re-distribution of the goods, the same are more efficiently and economically disposed of than possible under the present system of handling the goods, and the expense to the wholesale merchants of maintaining and operating separate or non-community warehouses is eliminated.

It will be understood that the invention is not limited to the details of construction and the arrangement of the working parts herein shown and described, for I am well aware that various changes therein may be made without departing from the spirit and scope of the invention, and I wish to be understood as claiming the invention as broadly as the state of the art will permit.

Having thus described the invention what is claimed as new and sought to be protected by Letters Patent is:—

1. A warehouse comprising a central assembling and re-distributing court, a plurality of independent storage warehouses radiating therefrom and communicating at one end therewith, and railway trackage leading from said court to a distant point and providing a means for intercommunication between said respective storage warehouses and between said warehouses and said court.

2. A warehouse comprising a central assembling and re-distributing court, a plurality of independent storage warehouses radiating therefrom and communicating at one end therewith, ship docking piers communicating with said court and storage warehouses, and railway trackage leading from said court to a distant point, and providing a means for intercommunication between said court, piers, and storage warehouses.

3. A warehouse comprising a central assembling and re-distributing court provided with a turn-table in the center thereof, a plurality of segmental platforms radiating therefrom and each separated by a passageway, a plurality of independent storage warehouses radiating from said court and communicating therewith at one end, and railway trackage leading from said court to a distant point and providing through said turn-table and also independently thereof intercommunication between said independent storage warehouses and said platforms, and between said respective storage warehouses.

4. A warehouse comprising a central assembling and re-distributing court, a plurality of independent storage warehouses radiating therefrom and communicating at one end therewith, railway trackage leading from said court to a distant point, railway trackage in said storage warehouses and communicating with the trackage in said court, and loading and distributing platforms in said storage warehouses adjacent the trackage therein.

5. A warehouse comprising a central assembling and re-distributing court, a plurality of independent storage warehouses radiating therefrom and communicating at one end therewith, a telpher system connecting said storage warehouses, and railway trackage leading from said court to a distant point and providing a means of intercommunication between said respective storage warehouses and between said warehouses and court.

6. A warehouse comprising a central assembling and re-distributing court provided with a turn-table in the center thereof, a plurality of platforms around the same, a plurality of independent storage warehouses radiating from said court and communicating therewith at one end, and each provided with a platform therein, railway trackage leading from said court to a distant point communicating trackage surrounding said platforms in said court and communicating with said first mentioned trackage, either through or independently of said turn-table, railway trackage in each of said storage warehouses adjacent the platforms therein and communicating with said trackage surrounding said platforms in said court, and a telpherage system connecting said storage warehouses and arranged above the railway trackage therein.

7. A warehouse comprising a central assembling and re-distributing court, a plurality of independent storage warehouses radiating therefrom and communicating at one end therewith, ship docking piers communicating with said warehouses through said court, railway trackage leading from said court to a distant point and providing a means of intercommunication between said court, piers and storage warehouses, and a telpher system connecting said piers and said storage warehouses.

8. A warehouse comprising a central assembling and re-distributing court, a plurality of independent storage warehouses radiating therefrom and communicating at one end therewith, ship docking piers communicating with said warehouses through said court, and a telpher system connecting said piers and said storage warehouses.

9. A warehouse comprising a central assembling and re-distributing court, a turn-table positioned centrally of said court and provided with intersecting railway tracks, a plurality of segmental platforms surrounding said turn-table and each separated by a passageway, railway trackage leading from said court to a distant point, railway trackage in said passageways between said platforms and connecting with said first mentioned trackage through said turn-table, and interconnecting trackage surrounding said plurality of platforms and communicating with said first mentioned trackage.

10. A warehouse comprising a central assembling and re-distributing court, a plurality of independent storage warehouses radiating therefrom and communicating at one end therewith, and ship docking piers communicating with said warehouses through said central court.

11. A warehouse comprising a central assembling and re-distributing court, a plurality of independent storage warehouses radiating therefrom and communicating at one end therewith, and conveying means intercommunicating with said warehouses and said court.

12. A warehouse comprising a circular assembling and re-distributing court, a plurality of independent radially disposed loading platforms therein, a plurality of independent storage warehouses, radiating from said court and communicating at one end therewith, a loading platform in each of said storage warehouses, and conveying means intercommunicating with said warehouses and said court.

In testimony whereof I have signed my name to this specification in the presence of the subscribing witness.

AUGUST SCHILLING.

Witness:
   D. B. RICHARDS.

Copies of this patent may be obtained for five cents each, by addressing the "Commissioner of Patents, Washington, D. C."